United States Patent
Estetter et al.

(10) Patent No.: US 6,874,501 B1
(45) Date of Patent: Apr. 5, 2005

(54) LUNG SIMULATOR

(76) Inventors: Robert H. Estetter, 5909 Ozark Trail La., Garland, TX (US) 75043; Thurman D. Holland, Jr., 302 Lois St., Roanoke, TX (US) 76262; Jason T. Higgins, 2310 Woodside Dr., Arlington, TX (US) 76016

( * ) Notice: Subject to any disclaimer, the term of this patent is extended or adjusted under 35 U.S.C. 154(b) by 241 days.

(21) Appl. No.: 10/313,694

(22) Filed: Dec. 6, 2002

(51) Int. Cl.[7] .................... A62B 37/00; G09B 23/28
(52) U.S. Cl. .................... 128/205.15; 128/205.13; 434/262; 434/272
(58) Field of Search .................... 128/202.28, 202.29, 128/203.11, 205.13, 205.14, 205.15, 205.16, 205.17, 203.28; 601/153; 434/262, 266, 267, 272

(56) References Cited

U.S. PATENT DOCUMENTS

| | | | |
|---|---|---|---|
| 3,049,811 A | 8/1962 | Ruben | |
| 3,058,460 A | 10/1962 | Goodner | |
| 3,154,881 A | 11/1964 | Elwell | |
| 3,273,261 A | 9/1966 | Lovercheck | |
| 3,274,705 A | 9/1966 | Breakspear | |
| 3,276,147 A | 10/1966 | Padellford | |
| 3,374,554 A | 3/1968 | Bella | |
| 3,890,967 A | 6/1975 | Elam et al. | |
| 4,001,950 A | 1/1977 | Blumensaadt | |
| 4,167,070 A | 9/1979 | Orden | |
| 4,821,712 A | 4/1989 | Gossett | |
| 5,109,838 A | 5/1992 | Elam | |
| 5,597,310 A | * 1/1997 | Edde | 434/272 |
| 5,823,787 A | * 10/1998 | Gonzalez et al. | 434/265 |
| 6,213,120 B1 | 4/2001 | Block et al. | |
| 6,723,132 B2 | * 4/2004 | Salehpoor | 623/23.65 |

* cited by examiner

Primary Examiner—Henry Bennett
Assistant Examiner—Andrea M. Ragonese

(57) ABSTRACT

The present invention provides a lung simulator comprising a substantially-rigid, fluid-tight, translucent housing simulating a human thoracic cavity and at least one flexible air-tight bag simulating a lung having a plurality of simulated lung lobes, and a corresponding plurality of valves, each of the plurality of valves coupled to a one of the plurality of simulated lung lobes and configured to simulate varying degrees of fluid flow resistance. In a preferred embodiment, the substantially-rigid, fluid-tight, transparent housing has isolated simulated left and right thoracic cavities therein and the at least one flexible air-tight bag is located within one of the simulated thoracic cavities. The present invention further provides a method of manufacturing a lung simulator.

19 Claims, 3 Drawing Sheets

LUNG SIMULATOR

TECHNICAL FIELD OF THE INVENTION

The present invention is directed, in general, to a lung simulator and, more specifically, to a lung simulator that may be used as an educational tool and as a tool to set parameters of mechanical ventilators for specific pathophysiologies.

BACKGROUND OF THE INVENTION

While lung simulators are known in the art, they are typically limited to devices suitable for cardiopulmonary resuscitation (CPR) training such as: U.S. Pat. Nos. 3,276,147 to de Bella, U.S. Pat. No. 4,001,950 to Blumensaadt, and U.S. Pat. No. 3,049,811 to Ruben. These patents illustrate the effect of mouth-to-mouth resuscitation upon one or more inflatable bags having some resistance to inflation and related operating equipment. Likewise, U.S. Pat. No. 3,274,705 to Breakspear illustrates a plurality of bags connected to inflate and deflate responsive to mount-to-mouth-resuscitation. None of these devices are suitable to demonstrate the interaction of the organs resident within a human thoracic cavity.

U.S. Pat. No. 4,167,070 to Orden (Orden) discloses an educational lung simulator having two single bladders, simulating left and right human lungs, within a self-supporting, transparent housing. The simulated left and right human lungs are suspended in spaces surrounded by a gas. On the contrary, human lungs are actually surrounded by a fluid. Four fixed-mass elements are mounted, one to each of a front face of one of the simulated lungs, two to inner surfaces of the simulated left and right lungs, and one to a single upper face of the other of the simulated lungs to exert "diverse pressures differing from one another" by positioning the simulator in different positions and orientations. However, close reading of Orden reveals that what is termed an "upper face 28 of lung 9a" is actually the lowermost tip of the simulated lung. This reversal of top and bottom is evident from FIG. 1 because the simulated esophagus 12 is located at the bottom of the FIGURE. Obviously, the fixed masses are not even symmetrical with respect to the two simulated lungs and, as demonstrated, weights are not accurately positioned. Therefore, it is clear that discrete fixed weights attached to the simulated, single bladder lungs provide only a very rough approximation of the complexities of the human lung system. Pressures within a pleural cavity surrounding the simulated left and right lungs are controlled by manually adjusting a bellows apparatus. Furthermore, there is no differentiation between the structure of the left and right simulated lungs as actually exists in a human.

Accordingly, what is needed in the art is a more accurate simulator of the human lung system with emphasis on presentation of the full range of lung maladies and injuries.

SUMMARY OF THE INVENTION

To address the above-discussed deficiencies of the prior art, the present invention provides a lung simulator comprising a substantially-rigid, fluid-tight, translucent housing simulating a human thoracic cavity and at least one flexible air-tight bag simulating a lung having a plurality of simulated lung lobes, and a corresponding plurality of valves, each of the plurality of valves coupled to a one of the plurality of simulated lung lobes and configured to simulate varying degrees of fluid flow resistance. In a preferred embodiment, the substantially-rigid, fluid-tight, transparent housing has isolated simulated left and right thoracic cavities therein and the at least one flexible air-tight bag is located within one of the simulated thoracic cavities. The present invention further provides a method of manufacturing a lung simulator.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

The invention is best understood from the following detailed description when read with the accompanying FIGURES. It is emphasized that in accordance with the standard practice in the industry, various features are not drawn to scale. In fact, the dimensions of the various features may be arbitrarily increased or reduced for clarity of discussion. Reference is now made to the following descriptions taken in conjunction with the accompanying drawings, in which.

DETAILED DESCRIPTION

Figure 1:
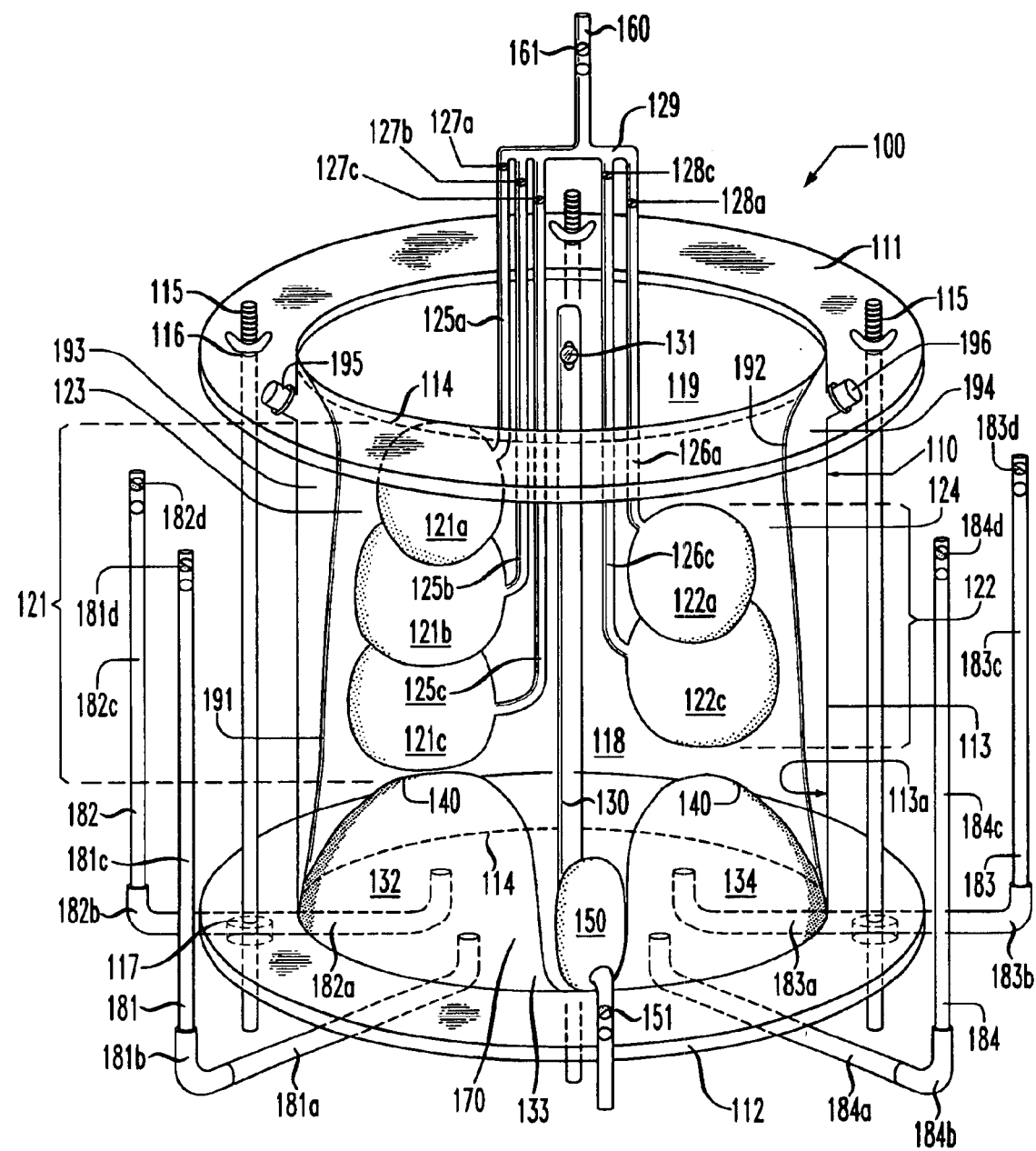
FIG. 1 illustrates a front elevation, partial sectional view of a lung simulator constructed according to the principles of the present invention.

Referring initially to FIG. 1, illustrated is a front elevation, partial sectional view of a lung simulator 100 constructed according to the principles of the present invention. The lung simulator 100, in the particular embodiment shown, comprises a simulated human thoracic cavity 110, right and left simulated human lungs 121, 122, respectively, a simulated mediastinum 130, a simulated human diaphragm 140, a simulated human heart 150, a simulated human trachea 160, a simulated lower abdominal cavity 170, a plurality of manometers 181–184, and right and left flexible membranes 191, 192, respectively, that define right and left simulated pleural spaces 193, 194, respectively. In a preferred embodiment, the simulated human thoracic cavity 110 is a substantially-rigid, fluid-tight, translucent housing 110 constructed primarily of sheet polymethylmetracrylate. In a preferred embodiment, the housing 110 is transparent so as to make changes internal to the housing 110 readily visible. Of course, other suitable materials are also within the broadest scope of the present invention. For convenience of construction, the simulated human thoracic cavity 110 has a top plate 111, a bottom plate 112, and a substantially-oviform outer wall 113 that approximate a cross section of a human chest. In a preferred embodiment, the top plate 111, bottom plate 112, and outer wall 113 are all formed from rigid sheet polymethylmetracrylate. To achieve a fluid-tight housing 110, the top and bottom plates 111, 112, are sealed with clear silicone sealant 114 to the substantially-oviform outer wall 113. The simulated thoracic cavity 110 may be filled with a liquid, e.g., water, to simulate certain conditions which the present invention is intended to demonstrate. Therefore, a plurality of threaded rods 115 extend through apertures 116, 117, respectively, in both the top plate 111 and the bottom plate 112 to assure the integrity of the fluid-tight housing 110 and to assist the silicone sealant 114 in sealing against the hydraulic pressures created within the simulated thoracic cavity 110. To avoid introducing unnecessary potential leak sites in the top and bottom plates 111 112, the apertures 116, 117 and the threaded rods 115 are located outside of the substantially-oviform outer wall 113. The plurality of threaded rods 115 also serve to support the lung simulator 100 upon a display surface. In a preferred embodiment, the flexible membranes 191, 192 are coupled to an inner surface 113a of the outer wall 113 thereby simulating the right and left pleural spaces 193, 194. The left and right pleural spaces 193, 194 are configured to receive a fluid therein through valves 195, 196, respectively.

In a preferred embodiment, the simulated mediastinum 130 comprises an independent, flexible chamber in vertical arrangement substantially in the center of the simulated thoracic cavity 110. The simulated mediastinum 130 is configured to be inflated or deflated with a fluid, e.g., air, water, etc., simulating various conditions of the human thoracic cavity. A control valve 131 is coupled to and configured to control inflation or deflation of the simulated mediastinum 130 with a fluid, e.g., air, water, etc. The simulated mediastinum 130 is mechanically coupled with an adhesive, e.g., a silicone sealant, to the top plate 111, the bottom plate 112 and to both a front face 118 and a rear face 119 of the substantially-oviform outer wall 113. Thus, the mediastinum 130 divides the simulated human thoracic cavity 110 into fluid-tight, independent simulated right and left thoracic cavities 123, 124, respectively, configured to be inflated or deflated with a fluid, e.g., air, water, etc.

The simulated human diaphragm 140 is coupled to the bottom plate 112 and to the base of the mediastinum 130 so as to form a simulated lower abdominal cavity 132 comprising right and left simulated lower abdominal cavities 133, 134, respectively. In a preferred embodiment, the plurality of manometers 181–184 are coupled to the bottom plate 112, and divided equally between the right and left simulated lower abdominal cavities 133, 134. That is manometers 181, 182 are coupled to and in fluid communication with the right simulated lower abdominal cavity 133. Likewise, manometers 183, 184 are coupled to and in fluid communication with the left simulated lower abdominal cavity 134. Manometers 181–184 are configured to independently control inflation or deflation of the right and left simulated lower abdominal cavities 133, 134. In a preferred embodiment, the plurality of manometers 181–184 comprise horizontal portions 181a–184a, elbows 181b–184b and vertical portions 181c–184c. Furthermore, in a preferred embodiment, the horizontal portions 181a–184a and elbows 181b–184b are PVC, and the vertical portions 181c–184c are clear TYGON® tubing. TYGON® is a registered trademark of Saint-Gobain Performance Plastics Corporation of Akron, Ohio. In one embodiment, C the plurality of manometers 181–184 are open-tube manometers. In a preferred embodiment, the plurality of manometers 181–184 are inclined-tube manometers. One who is skilled in the art is familiar with open-tube and inclined-tube manometers and their function. In a preferred embodiment, the plurality of manometers 181–184 are individually coupled to a one of a corresponding plurality of lung resistance valves 181d-184d. The plurality of lung resistance valves 181d-184d are configured to control fluid flow resistance ($R_{lung}$) in simulated small airways, e.g., alveolar and other small airways, etc., in the simulated lungs 121, 122.

The simulated heart 150 is a flexible, non-resilient, airtight bag 150 that can be inflated or deflated by application of pressure or fluid through a valve 151 in fluid communication with the simulated heart 150. This is extremely useful for simulating heart related conditions that affect the lungs, e.g., enlarged heart, can be simulated by appropriate inflation/deflation. The simulated heart 150 is positioned proximate the simulated left lung 122 and its size therefore affects volume available to the simulated left lung as in the human. Of course, a manometer (not shown) may also be coupled to the simulated heart 150 through valve 151 to control or monitor pressures in the simulated heart 150 as a result of changing pressures in the simulated right and left thoracic cavities 123, 124.

In a preferred embodiment, the right simulated lung 121 located in the right thoracic cavity 123 comprises flexible, non-resilient, air-tight bags 121 having a right upper lobe 121a, a right middle lobe 121b, and a right lower lobe 121c. Similarly, the left simulated lung 122 located in the left thoracic cavity 124 comprises flexible, non-resilient, airtight 122 having a left upper lobe 122a, and a left lower lobe 122c. This configuration more accurately parallels the five lobes of a human lung system than any known prior art. In one embodiment, the lobes 121a–121c, 122a & 122c may comprise rubber bladders simulating the size and flexibility of human lung lobes. In an alternative embodiment, the lobes 121a–121c, 122a & 122c may comprise pig lungs that may be suspended in a solution of formaldehyde within the simulated thoracic cavity 110. Coupled to each simulated lung lobe 121a–121c, 122a & 122c is a corresponding tube 125a–125c, 126a & 126c, and a corresponding valve 127a–127c, 128a & 128c, respectively. The valves 127a–127c, 128a & 128c control fluid flow resistance in their respective tubes 125a–125c, 126a & 126c which may also be referred to as simulated large anatomical airways 125a–125c, 126a & 126c of a human. Fluid flow resistance in the large anatomical airways 125a-125c, 126a & 126c may be represented as $R_{la}$. The valves 127a–127c, 128a & 128c thereby regulate inflation and deflation of the respective simulated lung lobes 121a–121c, 122a & 122c. In a preferred embodiment, the valves 127a–127c, 128a & 128c are polyvinyl chloride (PVC) ball valves and the tubes 125a-125c, 126a & 126c are Tygon® tubing. One who is skilled in the art is familiar with how to form fluid-tight joints between the simulated lung lobes 121a–121c, 122a & 122c, the tubes 125a–125c, 126a & 126c, and the valves 127a–127c, 128a & 128c.

The valves 127a–127c, 128a & 128c are coupled together so as to form a manifold 129 thereby enabling both lungs 121, 122 to be filled through the simulated human trachea 160 with a fluid, e.g., air, water, etc., to simulate various conditions of the human lung. The manifold 129 further comprises a valve 161 coupled to the simulated trachea 160 that is in fluid communication with both lungs 121, 122. In one exemplary embodiment, the valve 161 is configured to control upper airway resistance ($R_a$) during lung simulation.

Figure 2:
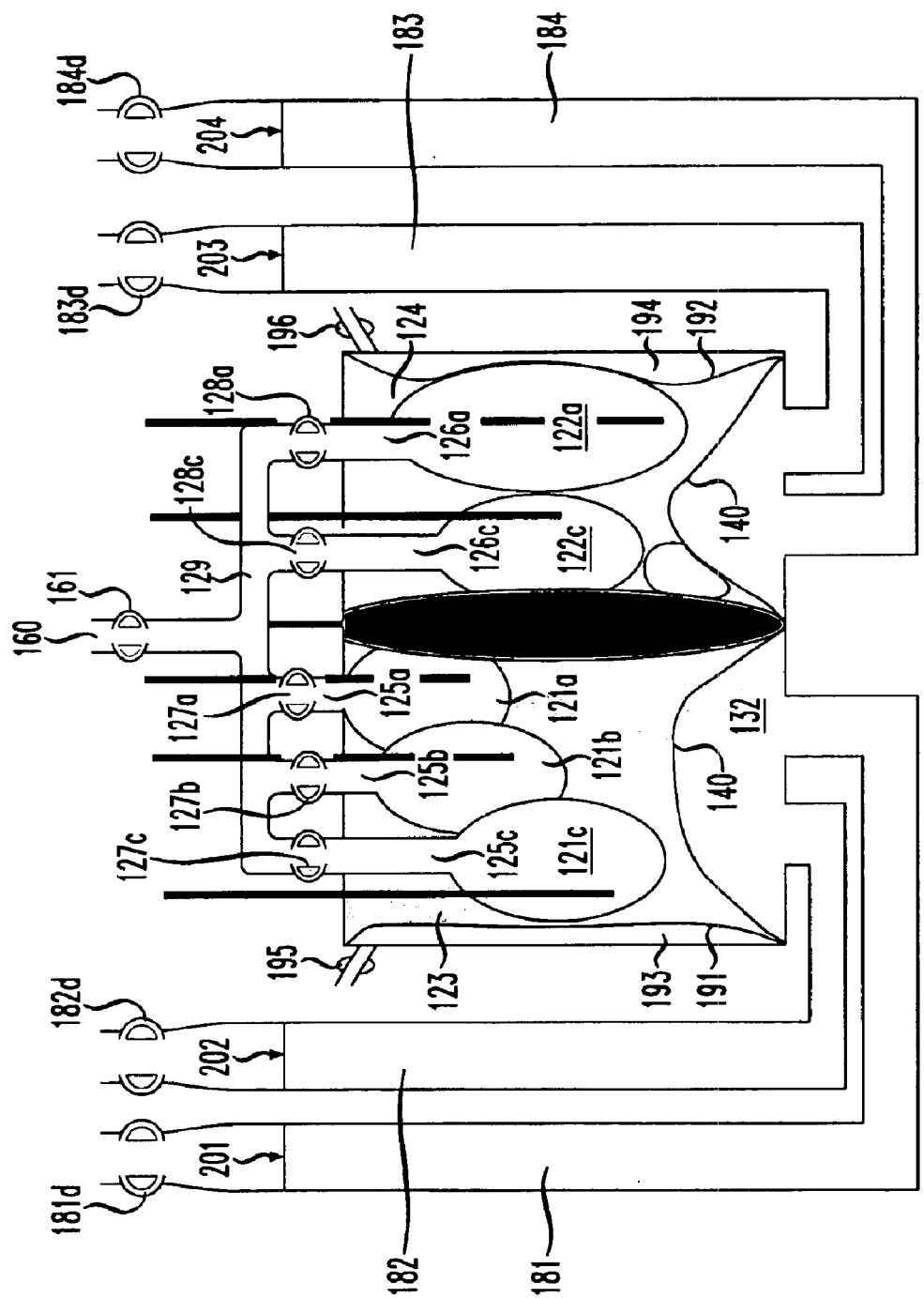
FIG. 2 illustrates a vertical schematic of the lung simulator of FIG. 1 simulating positive pressure breathing.

Referring now to FIG. 2, illustrated is a vertical schematic of the lung simulator of FIG. 1 simulating positive pressure breathing. In order to correlate operation of the lung simulator in the present figure with the elevation view of FIG. 1, call out numbers on the schematic (FIG. 2) relate directly to the same elements of FIG. 1. In a preferred embodiment simulating a normal human lung condition, i.e., disease free, the simulated right and left thoracic cavities 123, 124 (FIG. 1) and the right and left lower abdominal cavities 133, 134 (FIG. 1) are water filled. Similarly, the manometers 181–184 are partially filled as shown by menisci 201–204. Ball valves 127a–127c, 128a & 128c are adjusted to control simulated resistances of the large anatomical airways $R_{la}$. In a like manner, ball valves 181d–184d are adjusted to simulate the resistances $R_{lung}$ of the small airways with alveoli. Resistance of the main airway (trachea) is controlled by adjusting ball valve 161.

Simulating positive pressure respiration, inspiration is accomplished by increasing air pressure through the simulated trachea 16D. Air is forced past the main airway resistance valve 161, through the manifold 129, past the individual large airway valves 127a–127c, 128a & 128c to the individual lung tubes 125a–125c, 126a & 126c, and into each of the right and left lung lobes 121a–121c, 122a & 122c. Pressure thus applied will inflate the lung lobes 121a–121c, 122a & 122c from the top 121a, 122a first to the bottom 121c, 122c last. Consequently, the lung lobe inflation displaces water within the simulated right and left thoracic cavities 123, 124, forcing the diaphragm 140 downward and forcing water in the lower abdominal cavity 132 outwardly through the plurality of manometers 181–184 toward each of the valves 181d–184d. Therefore, water rises in the plurality of manometers 181–184 with the rate at which it rises controlled by the setting of the valves 181d–184d. Expiration in positive pressure respiration is accomplished by releasing inflowing pressure at the trachea 160, resulting in the water columns of the manometers 181–184 reversing the process.

Figure 3:
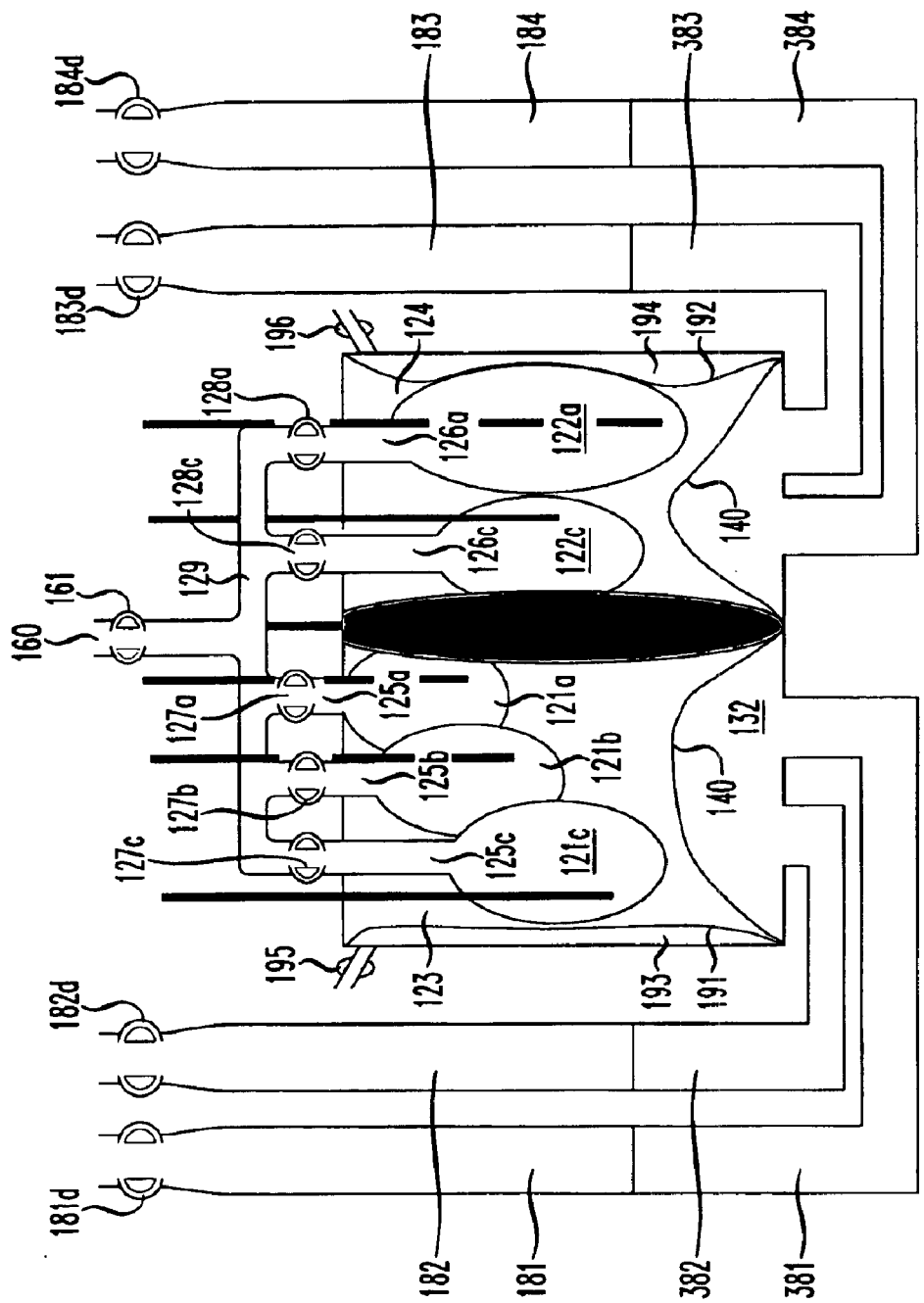
FIG. 3 illustrates a vertical schematic of the lung simulator of FIG. 1 simulating negative pressure breathing.

Referring now to FIG. 3, illustrated is a vertical schematic of the lung simulator of FIG. 1 simulating negative pressure breathing. Simulating negative pressure respiration, exhalation is accomplished by increasing air pressure through the four manometers 181–184. Air pressure forces water 381–384 in the four manometers 181–184 to displace downward and the diaphragm 140 to displace upwardly. Because the volume of the water in the simulated right and left thoracic cavities 123, 124 is incompressible, pressure increases on the lung lobes 121a-121c, 122a & 122c, forcing air from the lung lobes 121a–121c, 122a& 122c. The rate at which air is forced from the lung lobes 121a–121c, 122a & 122c is a function of: (a) the pressure applied to the manometers 181–184, (b) the large airway resistance $R_{la}$ set in the large anatomical airways 125a–125c, 126a& 126c, and (c) the upper airway resistance $R_a$ in the trachea 160 set by the main airway resistance valve 161. During inspiration, air pressure on the manometers 181–184 is relaxed, and the water 381, 384 therefore rises, the diaphragm 140 moves downward thus causing a low pressure in the lung lobes 121a–121c, 122a & 122c pulling air into the lung lobes 121a–121c, 122a & 122c through the trachea 160.

Some of the simulation opportunities using the present invention are as follows. Pressure can be controlled in the mediastinum 130 by a fluid, e.g., water, air, etc., being introduced therein. Individual lung lobes 121a–121c, 122a & 122c or an entire simulated lung 121, 122 can be collapsed by introducing a fluid into the left or right simulated pleural spaces 191, 192, respectively, simulating a collapsed lobe/lung. Emphysema likewise can be simulated by increasing the resistance of the small airways $R_{lung}$ by adjusting valves 181d–184d, as required. Height of the water columns of manometers 181–184 can be adjusted by rotating one or more of the vertical portions 181c–184c about the elbows 181b–184b, thereby forming inclined manometer(s) Independent pressure measurements can be taken for each liquid-tight compartment of the simulator, including: the simulated lungs 121, 122; the lung lobes 121a–121c, 122a & 122c, the simulated mediastinum 130, and the simulated heart 150. Human conditions that can be simulated include: individual lobe hemo- or pneumothorax, heart enlargement, hemo- or pneumomediastinum (bleeding or air leak), increased or decreased lung opening pressures, different lung compliances, positional (standing, prone, supine, left lateral and right lateral) changes of the human, lung resistance, etc. Pressure measurements can be obtained for pleural, mediastinum, carinal, each lung lobe, airway, and subdiaphragmatic to enable study and demonstration of various disease states, abdominal trauma, unilateral lung disease, asthma, spontaneous breathing, etc., and their interaction with human breathing. Demonstration of both positive and negative pressure ventilation can be accomplished. It should also be noted that the simulation of gravity effects, i.e., the weight of the physical structure on the human thoracic cavity, upon the lungs is much more realistic than the prior art. This is achieved by the use of fluid which surrounds the simulated lung lobes in three dimensions, rather than fixed weights placed upon a surface of the simulated lungs.

It should be noted that while the above description of the lung simulator has focused on visualization of the mechanics of human lung operation, the present invention is also well suited to the calibration and adjustment of working pressures for mechanical medical ventilators. That is, conditions known to exist in a patient may be simulated with the present invention coupled to a ventilator intended to be used with the patient. Various adjustments may then be made to the settings of the ventilator, visually observing the result that will be obtained in the patient's condition, thereby to achieve the optimal condition(s) for the patient.

Furthermore, the present invention lends itself to demonstration of a course or courses on the human lung, its diseases, adverse conditions, etc. Such an instructional course(s) may be prepared on video media or conventional movie film for distribution to medical schools, hospitals, etc., that have an ongoing need to train or refresh the learning of doctors/nurses/allied health specialists, etc., yet do not wish to purchase the lung simulator. Such video courses would also be useful in high schools, secondary schools and universities. Emergency medical technicians, firefighters, rescue workers, medical equipment engineers, etc., may also avail themselves of a learning opportunity thereby.

Although the present invention has been described in detail, those skilled in the art should understand that they can make various changes, substitutions and alterations herein without departing from the spirit and scope of the invention in its broadest form.

What is claimed is:

1. A lung simulator, comprising:
   a substantially-rigid, fluid-tight, translucent housing simulating a human thoracic cavity, said housing having isolated simulated left and right thoracic cavities therein;
   at least one simulated lung located within a one of said simulated thoracic cavities and having a plurality of simulated lung lobes; and
   a corresponding plurality of valves, each of said plurality of valves coupled to a one of said plurality of simulated lung lobes and configured to simulate varying degrees of fluid flow resistance.

2. The lung simulator as recited in claim 1 wherein said at least one simulated lung is a simulated right lung located within said simulated right thoracic cavity and having a simulated right upper lung lobe, a simulated right middle lung lobe, and a simulated right lower lung lobe.

3. The lung simulator as recited in claim 2 further comprising a second simulated lung located within said simulated left thoracic cavity and having a simulated left upper lung lobe and a simulated left lower lung lobe.

4. The lung simulator as recited in claim 2 further comprising:
   a central flexible chamber simulating a mediastinum interposed said simulated left and right thoracic cavities, and configured to be inflated or deflated with a fluid; and
   a control valve coupled to said central flexible chamber and configured to control inflation or deflation of said central flexible chamber.

5. The lung simulator as recited in claim 4 wherein said transparent housing has a bottom and said mediastinum is coupled to said bottom, and further comprising;
   a membrane, simulating a diaphragm, coupled to said bottom and said mediastinum and forming a simulated lower abdominal cavity configured to be inflated or deflated with a fluid.

6. The lung simulator as recited in claim 5 wherein said simulated lower abdominal cavity comprises a left simulated lower abdominal cavity and a right simulated lower abdominal cavity.

7. The lung simulator as recited in claim 5 further comprising at least one manometer coupled to said simulated lower abdominal cavity and configured to control inflation or deflation of said simulated lower abdominal cavity.

8. The lung simulator as recited in claim 7 further comprising a valve coupled to said at least one manometer and configured to control fluid flow resistance in said at least one manometer.

9. The lung simulator as recited in claim 7 wherein said at least one manometer is an open-tube manometer or an inclined-tube manometer.

10. The lung simulator as recited in claim 1 further comprising:
    a tube simulating a trachea in fluid communication with said at least one simulated lung; and
    a valve, interposed said tube and said at least one simulated lung, configured to simulate varying degrees of fluid flow resistance.

11. The lung simulator as recited in claim 1 further comprising at least one flexible membrane located within and coupled to a wall of said one of said simulated thoracic cavities thereby, simulating a pleural space between said at least one flexible membrane and said wall.

12. A method of manufacturing a lung simulator, comprising:
    forming a substantially-rigid, fluid-tight, translucent housing simulating a human thoracic cavity, said housing having isolated simulated left and right thoracic cavities therein;
    locating at least one simulated lung within a one of said simulated thoracic cavities, said at least one simulated lung having a plurality of simulated lung lobes; and
    coupling each of a corresponding plurality of valves to a one of said plurality of simulated lung lobes and configuring said plurality of valves to simulate varying degrees of fluid flow resistance.

13. The method as recited in claim 12 wherein said at least one simulated lung is a simulated right lung located within said simulated right thoracic cavity and having a simulated right upper lung lobe, a simulated right middle lung lobe, and a simulated right lower lung lobe.

14. The method as recited in claim 13 further comprising:
    interposing a central flexible chamber simulating a mediastinum between said simulated left and right thoracic cavities, and configuring said central flexible chamber to be inflated or deflated with a fluid; and
    coupling a control valve to said central flexible chamber and configuring said control valve to control inflation or deflation of said central flexible chamber.

15. The method as recited in claim 14 wherein said transparent housing has a bottom and said mediastinum is coupled to said bottom, and further comprising:
    coupling a membrane simulating a diaphragm to said bottom and said mediastinum, forming a simulated lower abdominal cavity configured to be inflated or deflated with a fluid.

16. The method as recited in claim 15 further comprising coupling at least one manometer to said simulated lower abdominal cavity and configuring said at least one manometer to control inflation or deflation of said simulated lower abdominal cavity.

17. The method as recited in claim 16 further comprising coupling a valve to said at least one manometer and configuring said valve to control fluid flow resistance in said at least one manometer.

18. The method as recited in claim 12 further comprising:
    coupling a tube simulating a trachea in fluid communication with said at least one simulated lung; and
    interposing a valve between said tube and said at least one simulated lung, and configuring said valve to simulate varying degrees of fluid flow resistance.

19. The method as recited in claim 12 further comprising locating within and coupling at least one flexible membrane to an inner wall of said one of said simulated thoracic cavities thereby forming a simulated pleural space between said at least one flexible membrane and said inner wall.

* * * * *